(12) United States Patent
Pavlath et al.

(10) Patent No.: US 7,633,626 B2
(45) Date of Patent: Dec. 15, 2009

(54) FIBER OPTIC GYROSCOPE DEADBAND CIRCUMVENTION APPARATUS AND METHOD

(75) Inventors: George A. Pavlath, Thousand Oaks, CA (US); Daniel A. Tazartes, West Hills, CA (US)

(73) Assignee: Northrop Grumman Guidance and Electronics Co., Inc., Los Angeles, CA (US)

( * ) Notice: Subject to any disclaimer, the term of this patent is extended or adjusted under 35 U.S.C. 154(b) by 414 days.

(21) Appl. No.: 11/638,768

(22) Filed: Dec. 13, 2006

(65) Prior Publication Data

US 2008/0147338 A1  Jun. 19, 2008

(51) Int. Cl.
*G01C 19/72* (2006.01)
(52) U.S. Cl. .................................................. 356/464
(58) Field of Classification Search ................. 356/464, 356/474, 475, 476, 472
See application file for complete search history.

(56) References Cited

U.S. PATENT DOCUMENTS

| | | | | |
|---|---|---|---|---|
| 4,588,296 A | * | 5/1986 | Cahill et al. | 356/462 |
| 4,610,543 A | * | 9/1986 | Ferriss | 356/474 |
| 4,826,320 A | * | 5/1989 | Callaghan et al. | 356/474 |
| 5,131,750 A | * | 7/1992 | Gravel et al. | 356/464 |
| 5,225,889 A | * | 7/1993 | Fritze et al. | 356/476 |
| 5,249,031 A | * | 9/1993 | Fritze et al. | 356/474 |
| 5,374,990 A | * | 12/1994 | Hahn et al. | 356/467 |
| 5,416,584 A | * | 5/1995 | Kay | 356/475 |
| 5,684,591 A | * | 11/1997 | Lo et al. | 356/464 |
| 6,208,414 B1 | * | 3/2001 | Killpatrick et al. | 356/459 |
| 6,556,509 B1 | * | 4/2003 | Cekorich et al. | 356/477 |
| 7,088,452 B2 | * | 8/2006 | Killpatrick | 356/475 |
| 2004/0201851 A1 | * | 10/2004 | Killpatrick | 356/474 |

\* cited by examiner

*Primary Examiner*—Gregory J Toatley, Jr.
*Assistant Examiner*—Scott M Richey
(74) *Attorney, Agent, or Firm*—Lynn & Lynn

(57) ABSTRACT

A fiber optic gyroscope signal process dither system permits application of a low amplitude dither signal for many sampling periods without increasing the noise in the sampled outputs due to residual dither signals. A dither loop and an accumulator are added to a closed loop fiber optic gyroscope rotation sensing system. The dither loop has a delay and a gain that are adjusted to match the gain and delay of the fiber gyro loop. A zero mean dither of amplitude sufficient to break up the deadband is injected into to gyro and the dither loop. The dither loop filters the dither signal in the same manner as the gyro loop to provide a signal that is input to a differencing circuit to remove the dither signal from the gyro output.

14 Claims, 2 Drawing Sheets

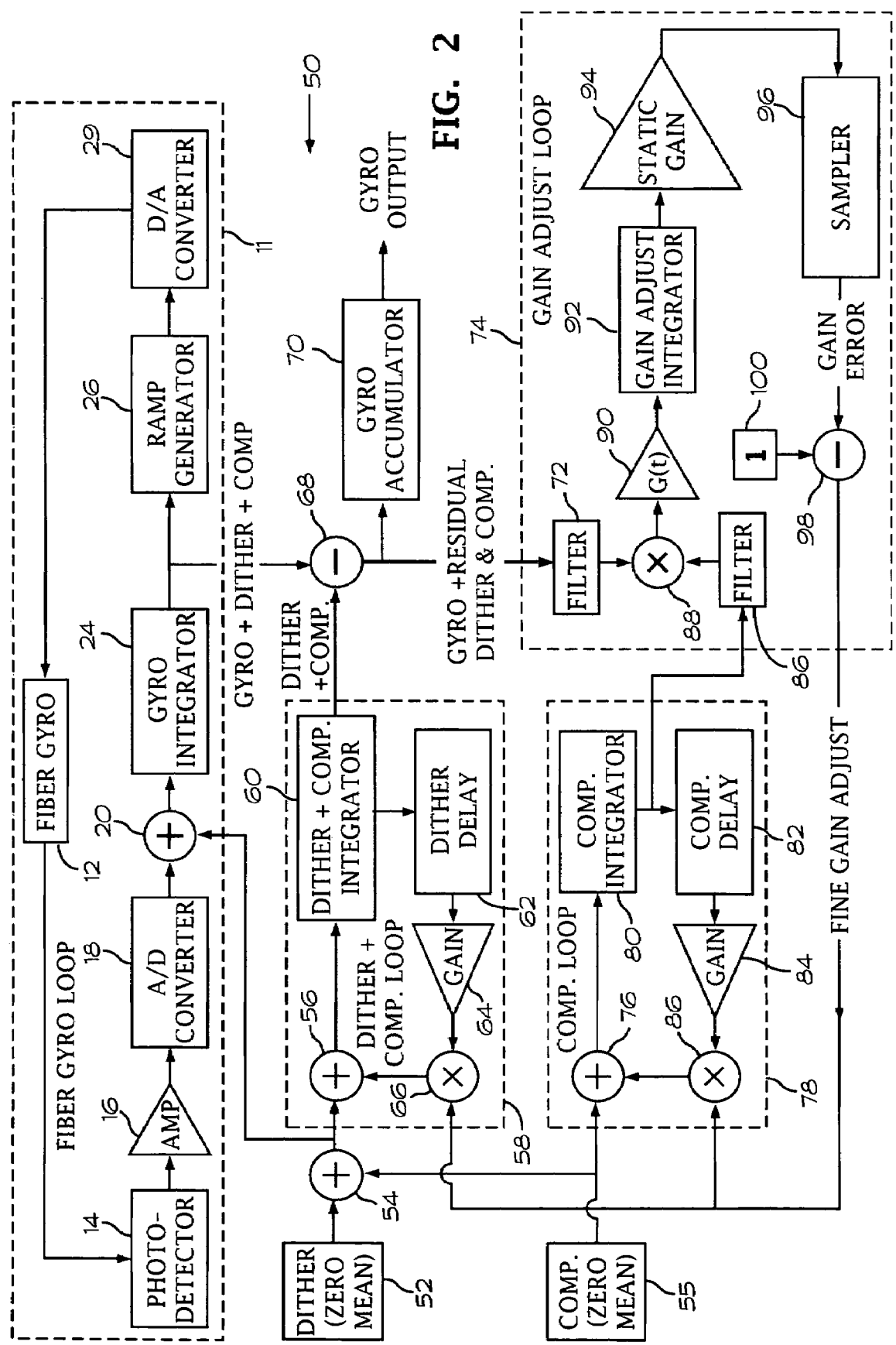

FIBER OPTIC GYROSCOPE DEADBAND CIRCUMVENTION APPARATUS AND METHOD

BACKGROUND OF THE INVENTION

This invention relates generally to fiber optic gyroscope rotation sensing systems. More particularly, this invention relates to the processing of signals output from a fiber optic gyroscope to measure rotation rates. Still more particularly, this invention relates to an improved dither system and method using a low amplitude dither signal in a fiber optic gyroscope signal processing system.

U.S. Pat. No. 5,020,912, which issued Jun. 4, 1991 to George A. Pavlath, one of the inventors of the present invention, discloses a deadband circumvention technique for a closed loop fiber gyro that uses deterministic phase modulation. A periodic zero mean dither signal is input to an integrator that also has the gyro demodulated rate signal as an input. A key requirement is that the gyro loop bandwidth be greater than the dither frequency, which in turn is larger than the sampling frequency. Ideally the dither frequency is at least ten times the sampling frequency, and the loop bandwidth is at least ten times the dither frequency. If these conditions are not met, problems occur in operation of the fiber optic gyro as a rotation sensor. The problems include saturation of the front end of the gyro control loop for large dither amplitudes due to the limited loop bandwidth and finite analog to digital converter input range and large dither residuals in the output if there are not precisely an integer number of dither cycles in the sampling period. Saturation in the control loop leads to increased random walk through failure to cancel the dither signal and other undesirable nonlinearities. Decreasing the amplitude of the dither signal to avoid saturation could result in there not being sufficient dither to break up the deadband at high sampling rates. Applying a small amplitude dither signal for a time longer than the sampling time causes each sample to include a large amount of residual dither. The disclosure of U.S. Pat. No. 5,020,912 is incorporated by reference into the present disclosure.

SUMMARY OF THE INVENTION

The present invention provides a dither system and method that permits application of a low amplitude dither signal for many sampling periods without increasing the noise in the sampled outputs due to residual dither signals. The advantages of the invention over the prior art are achieved by adding a dither loop and an accumulator to the signal processing system of fiber optic gyroscope rotation sensing system. The dither loop has a delay and a gain that are adjusted to match the gain and delay of the fiber gyro loop. A zero mean dither of amplitude sufficient to break up the deadband is injected into to gyro and the dither loop. The dither loop filters the dither signal in the same manner as the gyro loop to provide a signal that is input to a differencing circuit to remove the dither signal from the gyro output.

A method for circumventing a deadband in signals output from a fiber optic gyroscope comprises the steps of providing a fiber optic gyroscope loop that includes signal processing apparatus connected between an input and an output of the fiber optic gyroscope and injecting a dither signal into the signal processing apparatus so that the dither signal is added to signals output from the fiber optic gyroscope. The method further includes integrating the sum of the dither signal and the signals output from the fiber optic gyroscope with an integrator to produce a gyro output plus dither signal. The dither signal is injected into a dither loop that is arranged to provide a filtered dither signal that is filtered in the same manner that the fiber optic gyroscope loop filters the dither signal input thereto. The gyro output plus dither signal output from the fiber optic gyroscope and the filtered dither signal output from the dither loop are input to a differencing apparatus to provide a gyro signal output that includes no dither signal.

The method preferably comprises the step of adjusting the gain of the dither loop to equal the gain of the fiber optic gyroscope loop so that the signal output from the dither loop has an amplitude that is the same as the amplitude of the dither signal component of the signal output from the fiber optic gyroscope loop.

The method preferably also further comprises the steps of accumulating the gyro output plus dither signal from the integrator with a gyro accumulator and accumulating the filtered dither signal output from the dither loop with a dither accumulator. The gyro accumulator and the dither accumulator are sampled simultaneously and their outputs are input to the differencing apparatus to produce the gyro signal output.

The method may further comprise the steps of forming the dither loop to include a dither summing circuit arranged to receive the dither signal as an input, connecting an output of the dither summing circuit to a dither integrator, and connecting a dither delay circuit to the dither integrator to receive a signal output therefrom and to produce a delayed dither signal. The delayed dither signal is amplified and input to a dither multiplier that multiplies the amplified dither signal by a fine gain adjust signal. The dither multiplier is connected to the dither summing circuit so that signals output from the dither multiplier are added to the dither signal.

The method according to the present invention preferably further comprises the step of providing a calibration signal that is input to the dither loop so that the dither loop produces a dither plus calibration pilot signal output and so that the fiber optic gyroscope loop produces gyro plurality dither plus calibration signal output.

The method according to the present invention also preferably further comprises the steps of combining the gyro plus dither plus calibration signal output from the fiber optic gyroscope loop with the dither plus calibration signal in a differencing circuit to produce a gyro plus residual dither plus residual calibration signal output; and processing the calibration signal and the gyro plus residual dither plus residual calibration signal with a gain adjust loop arranged to provide a fine gain adjust signal that is input to both the dither loop and the calibration loop to adjust the gains thereof so that the residual dither signal and the residual calibration signal have zero amplitude so that the differencing circuit output is the gyro output without any dither or calibration signal component.

The method may further comprise the steps of forming the calibration loop to include a calibration summing circuit arranged to receive the calibration signal as an input, connecting an output of the calibration summing circuit to a calibration integrator, and connecting a calibration delay circuit to the calibration integrator to receive a signal output therefrom and to produce a delayed calibration signal. The delayed calibration signal is amplified and then input to a calibration multiplier that multiplies the amplified calibration signal by the fine gain adjust signal output from the gain adjust loop. The calibration multiplier is connected to the calibration pilot summing circuit so that signals output from the calibration multiplier are added to the calibration signal.

The method may also further comprise the steps of multiplying a filtered gyro plus residual dither plus residual calibration signal by a filtered signal output from the calibration integrator with a multiplier circuit and amplifying signals output from the multiplier with a variable gain amplifier. Signals output from the variable gain amplifier are integrated with a gain adjust integrator to produce an output that is amplified by a static gain amplifier. Signals output from the static gain amplifier are sampled with a sampling circuit to produce an error signal that is differenced from unity to obtain the fine gain adjust signal.

BRIEF DESCRIPTION OF THE DRAWINGS

FIG. 2 is block diagram of an enhanced second embodiment of the invention.

DETAILED DESCRIPTION OF THE INVENTION

Figure 1:
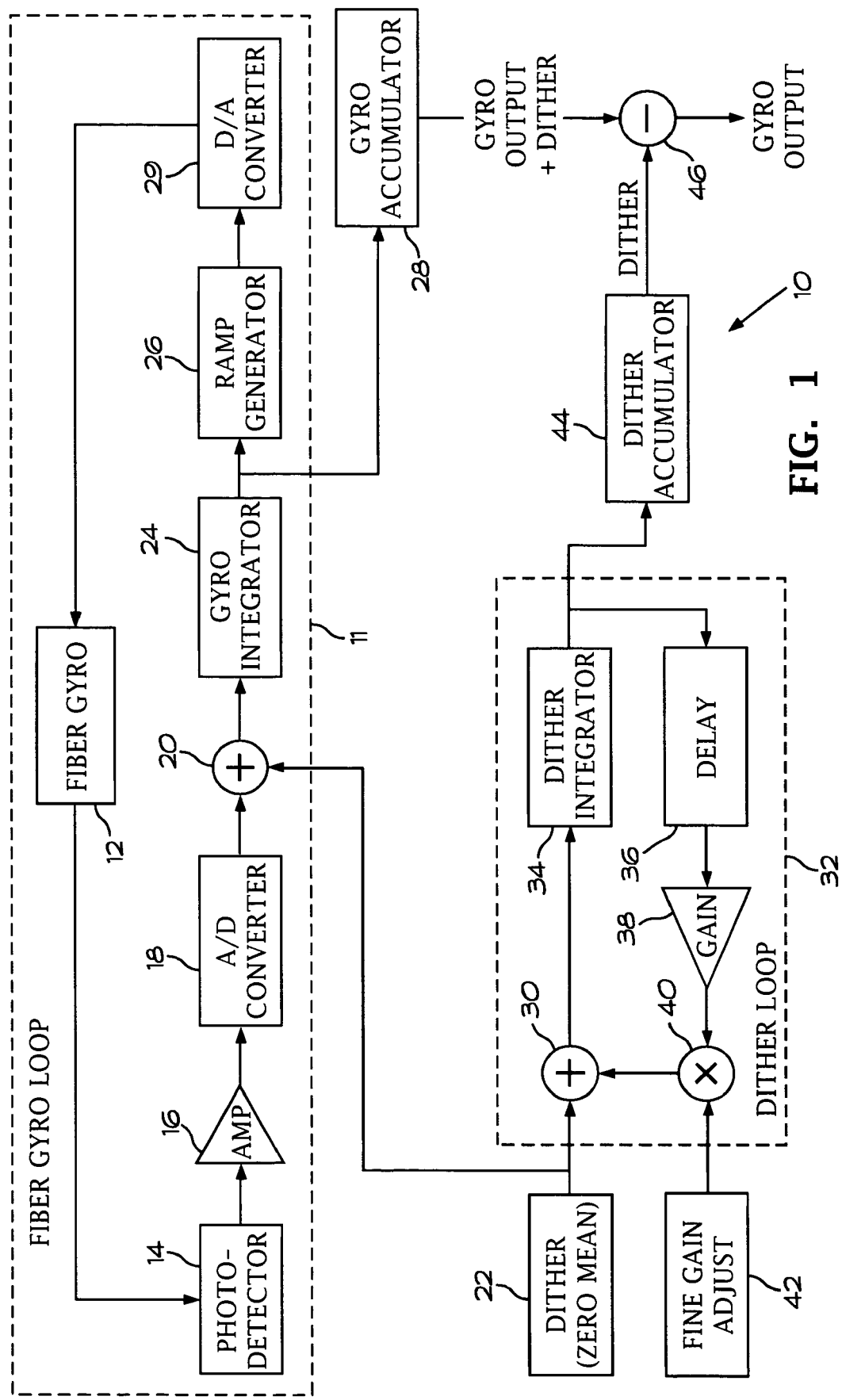
FIG. 1 is a block diagram of a first embodiment of the invention.

Referring to FIG. 1, a fiber optic rotation sensing system 10 includes a fiber gyro loop 11 that includes a fiber optic gyroscope 12 arranged to provide an optical signal to a photodetector 14. The photodetector 14 forms an electrical signal that corresponds to the optical signal input thereto. An amplifier 16 amplifies the electrical, signal output from the photodetector 14 and inputs the amplified electrical signal into an analog to digital converter 18, which converts the analog output of the fiber optic gyroscope 12 into a corresponding digital signal.

The digitized signal is input to a summer 20. A dither circuit 22 provides a dither signal to the summer 20. The summer 20 sums the digitized gyro output and the dither signal and input thereto and inputs a sum signal into a gyro integrator 24. The output of the gyro integrator 24 is input to both a ramp generator 26 and a gyro accumulator 28. The output of the ramp generator 26 is input to a digital to analog circuit 29 that is connected to the fiber gyro 12 so that the fiber gyro 12 receives a dithered ramp signal input.

The dither signal from the dither circuit 22 is also input to a summer 30 that is included in a dither loop 32. Signals output from the summer 30 are input to a dither integrator 34. The dither integrator 34 has an output that is connected to a delay circuit 36 in the dither loop 32. The delay circuit 36 is connected to an amplifier 38, which provides an amplified signal to a multiplier 40 that also receives a fine gain adjust signal from a fine gain circuit 42.

The output of the dither integrator 34 is also input to a dither accumulator 44. Signals output from the gyro accumulator 28 and the dither accumulator 44 are input to a differencing circuit 46.

The delay and gain of the dither loop 32 are adjusted to match the delay and gain of the fiber gyro loop 11. The dither circuit 22 provides a zero mean dither signal of amplitude sufficient to break up the deadband. The zero mean dither signal is injected into the gyro loop 11 at the summer 20, which is connected to the input of the gyro integrator 24. The zero mean dither signal is input to the dither loop 32 at the summer 30, which is connected to the input of the dither integrator 34. The function of the dither loop 32 is to filter the dither signal in essentially the same manner that the gyro loop 11 filters the dither signal to permit removal of the dither signal from the gyro output.

The output of the gyro integrator 24 is fed into the gyro accumulator 28, which is sampled and cleared at the gyro output frequency. As indicated in FIG. 1, the signal output of the resetting accumulator 28 contains the desired gyro output signal summed with the dither signal that has been filtered by its traversal of the gyro loop 11. The output of the dither integrator 34 is sent to the dither accumulator 44, which is sampled and reset at the same time as the gyro accumulator 28. The output of the dither accumulator 34 contains only the filtered dither signal. Differencing the output of the gyro accumulator 28 and the output of the dither accumulator 34 with the differencing circuit 46 as shown in FIG. 1 results in the dither being completely removed from the gyro output. Only the gyro signal is output from the differencing circuit 46.

The dither circuit of FIG. 1 typically is mechanized in the digital domain. In the digital domain the delay of the dither loop 32 can be set at the time of design to match the delay of the gyro loop 11 and will not vary. Sufficient cancellation of the dither requires that the gain of the dither loop 32 be matched to the gain of the gyro loop 11. In FIG. 1, the fine gain adjust circuit permits tuning the gain of the dither loop 32 via the multiplier 40. This fine gain adjustment permits tuning the gain of the dither loop 32 to match the gain of the gyro loop 11 to an accuracy sufficient to have negligible increase in gyro random walk.

FIG. 2 shows a fiber optic rotation sensing system 50 in accordance with the invention that includes an enhanced dither compensation loop that permits continuous adjustment of the fine dither gain without introducing a notch in the gyro frequency response. The functional features of the fiber optic rotation sensing system 50 are described after the following description of its structure.

FIG. 2 includes a gyro loop 11 that may be identical to the gyro loop 11 of FIG. 1. A dither circuit 52 produces a zero mean dither signal that is input to a summer 54. The summer 54 also receives a calibration signal from a calibration signal circuit 55 so that the summer 54 outputs a signal that is the sum of the dither signal and the calibration signal. The output of the summer 54 is input to the summer 20 of the gyro loop 11 and to a summer 56 included in a dither+calibration loop 58. The output of the summer 56 is input to a dither+calibration integrator 60. The integrated dither signal is input to a dither delay circuit 62, which outputs the delayed signal to an amplifier 64. The output of the amplifier 64 is input to a multiplier 66 that is arranged to provide an input to the summer 56 to complete the loop 58.

The dither+calibration integrator 60 is also connected to a differencing circuit 68, which also receives the output of the fiber gyro loop 11 provided by the gyro integrator 24. The output of the differencing circuit 68 is input to an accumulator 70 and to a filter 72 in a gain adjust loop 74.

The output of the calibration signal generator 55 is also input to a summer 76 that is included in a calibration loop 78. The output of the summer 76 is input to a calibration integrator 80 that is arranged to provide the integrated calibration signal to a calibration delay circuit 82. The output of the calibration delay circuit 82 is input to an amplifier 84, which has its output connected to an input of a multiplier 86.

The output of the calibration integrator 80 is also input to a filter 86 that is included in the gain adjust loop 74. The filter 86 output is input to a multiplier 88, which is also arranged to receive signals output from the filter 72. The multiplier 88 output is input to a variable gain amplifier 90 that provides amplified signals to a gain adjust integrator 92. The integrated signal output from the gain adjust integrator 92 is input to an amplifier 94 that has a static gain. The output of the amplifier 94 is connected to a sampler 96, which produces a gain error signal output. A differencing circuit 98 receives both the gain error signal and a numerical signal input that is preferably unity from a signal generator 100. The differencing circuit calculates the difference between unity and the gain error signal to produce a fine gain adjust signal that is input to the multiplier 66 in the dither+calibration loop 58 and to the multiplier 86 in the calibration loop 78. The multiplier 66 inputs the product of the fine gain adjust signal from the differencing circuit and the signal output from the amplifier 64 into the summer 56. The summer 56 adds the dither signal, the calibration signal and the output from the multiplier 66 to produce the signal that is input to the dither+calibration integrator 60 and also input to the gyro loop 11 at the summer 20.

The calibration signal is also a zero mean signal. The frequency of the calibration signal is selected to be higher that the required gyro bandwidth. A convenient choice for the calibration signal frequency is the sampling frequency of the gyro or an integer multiple thereof. This choice of calibration signal frequency simplifies implementing the invention digitally, but is not required. The relationship of the dither frequency, calibration frequency and the gyro bandwidth is shown in the expression:

$$f_{dither} < f_{gyro\ bandwidth} < f_{pilot}$$

Now that the structure of the embodiment of the invention shown in FIG. 2 has been described, its functional features will be described. The dither signal and the calibration signal are summed and their sum is injected into both the gyro loop 11 and the dither+calibration loop 58. Only the calibration signal is injected into the calibration loop 78. The output of the gyro integrator 24 and the output dither+calibration loop integrator 60 are differenced by the differencing circuit 68. The differenced signal is input to the accumulator 70 and accumulated to provide the gyro output. The differenced signal from the differencing circuit 68 is also fed into the first filter 72. If the gain of the dither+calibration loop 58 matches the gain of the gyro loop 11, then no dither or calibration signal will be present in the differenced output. If the gains do not match, then a dither and a calibration signal residual will be present in the differenced signal.

The first filter 72 is a high pass filter that can be mechanized in many ways known in the art. The purpose of the first filter 72 is to attenuate DC terms, the dither signal and the gyro signal while passing the residual calibration signal through with minimal attenuation. Any residual calibration signal after the filter indicates a gain error between the gyro loop 11 and the dither+calibration loop 58.

The output of the calibration loop is fed into the second filter 86 that preferably is identical to the first filter 72. The purpose of the second filter 86 is to provide exactly the same delay to the calibration signal so that the calibration signal is well aligned in time with the residual dither+calibration signal from the first filter 72.

The filtered gyro+dither+calibration signal is multiplied by the filtered calibration signal. Any residual calibration signal from the first filter 72 will rectify with the filtered calibration signal and create a DC term and higher harmonics. The DC term first is amplified by the variable gain amplifier 90. The variable gain amplifier 90 is provided to permit rapid capture of the proper fine gain at turn on (high gain) and the gain is lowered to permit tracking of the gain. The signal is next integrated, which accentuates the DC term and reduces the higher harmonics. The signal next sees the static gain amplifier 94, which has a gain chosen to ensure stable operation of the gain adjust loop 74. The signal is next sent to the resetting accumulator, which is sampled at an integer multiple of the calibration signal period by sampler 96. The number of calibration periods between samples is chosen to permit the gain adjust loop to track the gain fluctuations in the gyro loop 11.

The sampled DC term from the sampler 96 constitutes a gain error signal. This gain error signal is differenced from unity and is fed back into both the multiplier 66 in the dither+ calibration loop 58 and the multiplier 86 in the calibration loop 78. Feeding the gain error signal into the multipliers 66 and 86 adjusts the dither+calibration loop 58 gain and the calibration loop 78 gain to ensure that they track the gyro loop 11 gain in real time.

The present invention provides means for introducing a low amplitude, low frequency dither signal into a fiber gyro to break up the deadband. The amplitude of the dither signal is sufficiently low that any saturation in the gyro loop 11 is avoided. The present invention provides means for removing the low frequency dither signal from the higher frequency gyro output by use of the dither+calibration loop 58 as described above. The present invention also provides a method using the calibration loop 78 to enable the gain of the dither+calibration loop 58 and the gain of the calibration loop 78 to track the gain of the gyro loop 11, which ensures that adequate removal of the dither+calibration signal from the gyro output occurs as the gyro changes temperature or ages.

The present invention can be used in deterministically modulated, closed loop fiber gyros that have low gyro loop bandwidths and high sampling frequencies. It should be noted that all of the components shown in the block diagrams of FIGS. 1 and 2 are known in the art.

What is claimed is:

1. A method for circumventing a deadband in signals output from a fiber optic gyroscope, comprising the steps of:
   providing a fiber optic gyroscope loop that includes signal-processing apparatus connected between an input and an output of the fiber optic gyroscope;
   injecting a dither signal into the signal processing apparatus so that the dither signal is added to signals output from the fiber optic gyroscope;
   combining the sum of the dither signal and the signals output from the fiber optic gyroscope to produce a gyro output plus dither signal;
   dividing the gyro output plus dither signal into a first portion that is input to the fiber optic gyroscope and a second portion;
   injecting the dither signal into a dither loop that is arranged to provide a filtered dither signal that is filtered in the same manner that the fiber optic gyroscope loop filters the dither signal input thereto; and
   inputting the second portion of the gyro output plus dither signal output from the fiber optic gyroscope and the filtered dither signal output from the dither loop into a differencing apparatus to provide a gyro signal output that includes no dither signal.

2. The method of claim 1, further comprising the step of adjusting the gain of the dither loop to equal the gain of the fiber optic gyroscope loop so that the signal output from the dither loop has an amplitude that is the same as the amplitude of the dither signal component of the signal output from the fiber optic gyroscope loop.

3. The method of claim 2, further comprising the steps of:
   accumulating the gyro output plus dither signal with a gyro accumulator;
   accumulating the filtered dither signal output from the dither loop with a dither accumulator;
   sampling the gyro accumulator and the dither accumulator simultaneously; and
   inputting the sampled gyro accumulator output and the sampled dither accumulator output into the differencing apparatus to produce the gyro signal output.

4. The method of claim 2, further comprising the steps of:
   forming the dither loop to include a dither summing circuit arranged to receive the dither signal as an input;

connecting an output of the dither summing circuit to a dither integrator;

connecting a dither delay circuit to the dither integrator to receive a signal output therefrom and to produce a delayed dither signal;

amplifying the delayed dither signal;

applying the amplified dither signal to a dither multiplier;

multiplying the amplified dither signal by a fine gain adjust signal; and connecting the dither multiplier to the dither summing circuit so that signals output from the dither multiplier are added to the dither signal.

5. The method of claim 1, further comprising the step of providing a calibration signal generator that injects a calibration signal into the dither loop so that the dither loop produces a dither plus calibration signal output and so that the fiber optic gyroscope loop produces gyro plus dither plus calibration signal output.

6. The method of claim 5, further comprising the steps of:

combining the gyro plus dither plus calibration signal output from the fiber optic gyroscope loop with the dither plus calibration signal in a differencing circuit to produce a gyro plus residual dither plus residual calibration signal output; and processing the calibration signal and the gyro plus residual dither plus residual calibration signal with a gain adjust loop arranged to provide a fine gain adjust signal that is input to both the dither loop and the calibration loop to adjust the gains thereof so that the residual dither signal and the residual calibration signal have zero amplitude so that the differencing circuit output is the gyro output without any dither or calibration signal component.

7. The method of claim 6, further comprising the steps of:

forming the calibration loop to include a calibration summing circuit arranged to receive the calibration signal as an input;

connecting an output of the calibration summing circuit to a calibration integrator;

connecting a calibration delay circuit to the calibration integrator to receive a signal output therefrom and to produce a delayed calibration signal;

amplifying the delayed calibration signal;

applying the amplified calibration signal to a calibration multiplier;

multiplying the amplified calibration signal by the fine gain adjust signal output from the gain adjust loop; and connecting the calibration multiplier to the calibration summing circuit so that signals output from the calibration multiplier are added to the calibration signal.

8. The method of claim 6, further comprising the steps of:

multiplying a filtered gyro plus residual dither plus residual calibration signal by a filtered a signal output from the calibration integrator with a multiplier circuit;

amplifying signals output from the multiplier with a variable gain amplifier;

integrating signals output from the variable gain amplifier with a gain adjust integrator;

multiplying signals output from the gain adjust integrator with a static gain amplifier;

sampling signals output from the static gain amplifier with a sampling circuit to produce again error signal; and differencing the gain error signal from unity to obtain the fine gain adjust signal.

9. Apparatus for circumventing a deadband in signals output from a fiber optic gyroscope, comprising:

a fiber optic gyroscope loop that includes signal processing circuitry connected between an input and an output of the fiber optic gyroscope;

dither signal circuitry arranged to produce a dither signal, the dither signal circuitry including a first adjustable gain amplifier;

compensation signal circuitry arranged to produce a compensation signal, the compensation signal generation circuitry including a second adjustable gain amplifier;

summing apparatus arranged for summing the dither signal and the compensation signal together and inputting the sum of the dither signal and the compensation signal into the fiber optic gyroscope loop;

a differencing circuit having a first input connected to the fiber optic gyroscope loop to receive a signal therefrom that is a sum of the fiber optic gyroscope output signal, the dither signal and the compensation signal, the differencing circuit further having a second input arranged to receive the sum of the dither signal and the compensation signal, the differencing circuit providing an output that is the sum of the fiber optic gyroscope signal and residual dither and residual compensation signal caused by errors in the first and second adjustable gains;

gain adjust circuitry connected between the differencing circuitry and the dither signal circuitry and the compensation signal circuitry for processing the residual compensation signal to produce a fine gain adjust signal that is applied the first and second adjustable gain amplifiers to null the residual dither signal and the residual compensation signal in the fiber optic gyroscope loop output.

10. Apparatus for circumventing a deadband in signals output from a fiber optic gyroscope, comprising:

a fiber optic gyroscope loop that includes signal processing circuitry connected between an input and an output of the fiber optic gyroscope;

dither signal circuitry arranged to produce a dither signal, the dither signal circuitry including a first adjustable gain amplifier;

compensation signal circuitry arranged to produce a compensation signal, the compensation signal generation circuitry including a second adjustable gain amplifier;

a first summer arranged for summing the dither signal and the compensation signal together and inputting the sum of the dither signal and the compensation signal into the fiber optic gyroscope loop;

a differencing circuit having a first input connected to the fiber optic gyroscope loop to receive a signal therefrom that is a sum of the fiber optic gyroscope output signal, the dither signal and the compensation signal and a second input arranged to receive the sum of the dither signal and the compensation signal, the differencing circuit output being the sum of the fiber optic gyroscope signal and residual dither and compensation signals caused by errors in the first and second adjustable gains;

a filter circuit for filtering the differencing circuit output to remove the fiber optic gyroscope output and the residual dither signal therefrom, and for providing a gain error signal derived from the residual compensation signal; and a gain adjust circuit connected between the filter and the dither signal and the compensation signal circuitry arranged to produce a fine gain adjust signal for adjusting the first and second gains to null the residual compensation signal in the fiber optic gyroscope loop output.

11. The apparatus of claim 10, further comprising:

a dither signal plus compensation signal loop connected between to the fiber optic gyroscope loop and the first summer, the dither signal plus compensation signal loop including a second summer arranged to receive signals output from the first summer, a dither plus compensation signal integrator connected to an output of the second summer, a dither delay connected to an output of the dither plus compensation signal integrator, a first amplifier connected to an output of the dither delay, and a first multiplier circuit connected between an output of the dither delay circuit and the second summer;

a compensation signal loop connected between the filter circuit and the dither signal circuitry, the compensation signal loop including a third summer arranged to receive the compensation signal from the compensation signal circuitry, a compensation integrator connected to an output of the third summer, a compensation delay connected to an output of the compensation integrator, a second amplifier connected to an output of the compensation delay and a second multiplier connected between the second amplifier and the third summer; and wherein the gain adjust circuit produces a fine gain adjust signal that is input to the first and second multipliers to adjust the gains of the first and second amplifiers.

12. A method for circumventing a deadband in signals output from a fiber optic gyroscope, comprising the steps of:

providing a fiber optic gyroscope loop that includes signal processing circuitry connected between an input and an output of the fiber optic gyroscope;

arranging dither signal circuitry to produce a dither signal, the dither signal circuitry including a first adjustable gain amplifier;

arranging compensation signal circuitry to produce a compensation signal, the compensation signal generation circuitry including a second adjustable gain amplifier;

summing the dither signal and the compensation signal together;

inputting the sum of the dither signal and the compensation signal into the fiber optic gyroscope loop;

providing a differencing circuit having a first input connected to the fiber optic gyroscope loop to receive a signal therefrom that is a sum of the fiber optic gyroscope output signal, the dither signal and the compensation signal, the differencing circuit further having a second input arranged to receive the sum of the dither signal and the compensation signal, the differencing circuit providing an output that is the sum of the fiber optic gyroscope signal and residual dither and compensation signal caused by errors in the first and second adjustable gains;

connecting gain adjust circuitry between the differencing circuit and the dither signal circuitry and the compensation signal circuitry for processing the residual compensation signal to produce a fine gain adjust signal that is applied the first and second adjustable gain amplifiers to null the residual dither signal and the residual compensation signal in the fiber optic gyroscope loop output.

13. A method for circumventing a deadband in signals output from a fiber optic gyroscope, comprising the steps of:

providing a fiber optic gyroscope loop that includes signal processing circuitry connected between an input and an output of the fiber optic gyroscope;

arranging dither signal circuitry to produce a dither signal, the dither signal circuitry including a first adjustable gain amplifier;

arranging compensation signal circuitry to produce a compensation signal, the compensation signal generation circuitry including a second adjustable gain amplifier;

summing the dither signal and the compensation signal together;

inputting the sum of the dither signal and the compensation signal into the fiber optic gyroscope loop;

providing a differencing circuit having a first input connected to the fiber optic gyroscope loop to receive a signal therefrom that is a sum of the fiber optic gyroscope output signal, the dither signal and the compensation signal, the differencing circuit further having a second input arranged to receive the sum of the dither signal and the compensation signal, the differencing circuit providing an output that is the sum of the fiber optic gyroscope signal and residual dither and compensation signal caused by errors in the first and second adjustable gains;

arranging a filter circuit for filtering the differencing circuit output to remove the fiber optic gyroscope output and the residual dither signal therefrom, to derive a gain error signal from the residual compensation signal; and inputting the gain error signal into the dither signal circuitry and the compensation signal circuitry to adjust the first and second gains to null the residual dither signal and the residual compensation signal in the fiber optic gyroscope loop output;

forming the dither signal plus compensation signal loop to include a second summer arranged to receive signals output from the first summer, a dither plus compensation signal integrator connected to an output of the second summer, a dither delay connected to an output of the dither plus compensation signal integrator, a first amplifier connected to an output of the dither delay, and a first multiplier circuit connected between an output of the dither delay circuit and the second summer;

connecting a compensation signal loop connected between the filter circuit and the dither signal circuitry;

forming the compensation signal loop to include a third summer arranged to receive the compensation signal from the compensation signal circuitry, a compensation integrator connected to an output of the third summer, a compensation delay connected to an output of the compensation integrator, a second amplifier connected to an output of the compensation delay and a second multiplier connected between the second amplifier and the third summer; and arranging the gain adjust circuit to produce a fine gain adjust signal that is input to the first and second multipliers to adjust the gains of the first and second amplifiers.

14. The method of claim 13, further comprising the steps of:

connecting a dither signal plus compensation signal loop between to the fiber optic gyroscope loop and the first summer, the dither signal plus compensation signal loop including a second summer arranged to receive signals output from the first summer, a dither plus compensation signal integrator connected to an output of the second summer, a dither delay connected to an output of the dither plus compensation signal integrator, a first amplifier connected to an output of the dither delay, and a first multiplier circuit connected between an output of the dither delay circuit and the second summer;

connecting a compensation signal loop between the filter circuit and the dither signal circuitry, the compensation signal loop including a third summer arranged to receive the compensation signal from the compensation signal circuitry, a compensation integrator connected to an output of the third summer, a compensation delay connected to an output of the compensation integrator, a second amplifier connected to an output of the compensation delay and a second multiplier connected between the second amplifier and the third summer; and arranging the gain adjust circuit to produce a fine gain adjust signal that is input to the first and second multipliers to adjust the gains of the first and second amplifiers.

\* \* \* \* \*